United States Patent
Koren

(10) Patent No.: US 6,421,712 B1
(45) Date of Patent: Jul. 16, 2002

(54) METHOD AND APPARATUS FOR BROADCASTING INVALIDATION MESSAGES IN A COMPUTER SYSTEM

(75) Inventor: Yuval Koren, San Francisco, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/356,106

(22) Filed: Jul. 16, 1999

(51) Int. Cl.[7] .............................................. G06F 15/167
(52) U.S. Cl. ........................ 709/213; 709/214; 709/230; 709/232; 709/235
(58) Field of Search ................................. 709/214, 213, 709/230, 232, 235; 714/4; 711/205, 118, 127, 157, 147, 130, 133, 159

(56) References Cited

U.S. PATENT DOCUMENTS

| | | | | |
|---|---|---|---|---|
| 5,752,264 A | * | 5/1998 | Blake et al. ................. | 711/122 |
| 5,887,146 A | * | 3/1999 | Baxter et al. ............... | 709/400 |
| 6,339,812 B1 | * | 1/2002 | McCracken et al. ........ | 711/141 |

* cited by examiner

Primary Examiner—Mehmet B. Geckil
(74) Attorney, Agent, or Firm—Baker Botts L.L.P.

(57) ABSTRACT

A computer system (10) includes a node controller (12) operable to process invalidation requests. The node controller (12) includes a network interface unit (20), a memory directory interface unit (22), a processor interface unit (24), an input/output interface unit (26), a local buffer unit (28), and a crossbar unit (30). A local processor (16) generates an invalidation request that is processed by the processor interface unit (24) for placement into the local buffer unit (28). The invalidation request indicates that particular data within a local memory (18) associated with the node controller (12) has been altered by the local processor (16). The local buffer unit (28) generates a plurality of invalidation messages in response to the invalidation request, the invalidation messages being destined for remote processors (16) associated with remote node controllers (12) in the computer system (10) that share the particular data. The crossbar unit (30) arbitrates the transfer of the invalidation messages with data, control messages, and other traffic to and from all units associated with the node controller (12) so that the node controller (12) is not clogged with the transfer of invalidation messages.

20 Claims, 4 Drawing Sheets

METHOD AND APPARATUS FOR BROADCASTING INVALIDATION MESSAGES IN A COMPUTER SYSTEM

TECHNICAL FIELD OF THE INVENTION

The present invention relates in general to computer architecture and more particularly to a method and apparatus for broadcasting invalidation messages in a computer system.

BACKGROUND OF THE INVENTION

When a memory location is altered in a computer system, nodes and processors within that computer system that rely on and share the contents of that memory location must be informed that their version of the contents of the memory location have been altered and are no longer valid. An invalidation engine in a node of a computer system is used to process invalidation requests from a processor associated with the node that alters the shared memory by issuing an invalidation message to each affected node of the computer system indicated in the invalidation request. A single invalidation request may require a multitude of invalidation messages to be sent out the network port and across the interconnect to each affected node depending on the size of the computer system. The amount of effort and time required to broadcast a burst of invalidation requests and the invalidation messages associated therewith create several problems at the node. For example, the flood of invalidation messages from a node may monopolize its network port and cause other traffic to wait before being transferred or be potentially discarded altogether. Nodes may block the sending of invalidation requests to a busy invalidation engine for long periods of time, resulting in the tying up of the node's crossbar resources and preventing the ability to process further inputs. Therefore, it is desirable to avoid having invalidation requests clog up the operation of a computer system.

SUMMARY OF THE INVENTION

From the foregoing, it may be appreciated that a need has arisen for an invalidation engine technique that won't tie up computer system resources. In accordance with the present invention, a method and apparatus of broadcasting invalidation messages in a computer system are provided that substantially eliminate or reduce disadvantages and problems associated with conventional invalidation engine techniques.

According to an embodiment of the present invention, there is provided a node controller for broadcasting invalidation messages in a computer system that includes a memory directory unit for controlling access to data within a local memory device. A network interface unit is operable to provide data and control messages to and receive data and control messages from other node controllers in the computer system. A local buffer unit is operable to receive an invalidation request and generate a plurality of invalidation messages therefrom. A crossbar unit arbitrates the transfer of data and invalidation messages for the memory directory unit, the network interface, and the local buffer unit through an interleaving technique to prevent blocking of node controller operation during processing of invalidation requests.

The present invention provides various technical advantages over conventional invalidation engine techniques. For example, one technical advantage is the use of a local buffer to queue invalidation requests and messages generated therefrom. Another technical advantage is the use of a dedicated crossbar port to interleave large invalidation message groups with other classes of traffic flowing through the node controller. Yet another technical advantage is the ability to process all classes of traffic despite having a large number of invalidation requests to process. Still another technical advantage is to locally process invalidation requests despite the fact that the altered memory location is associated with a remote node controller. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
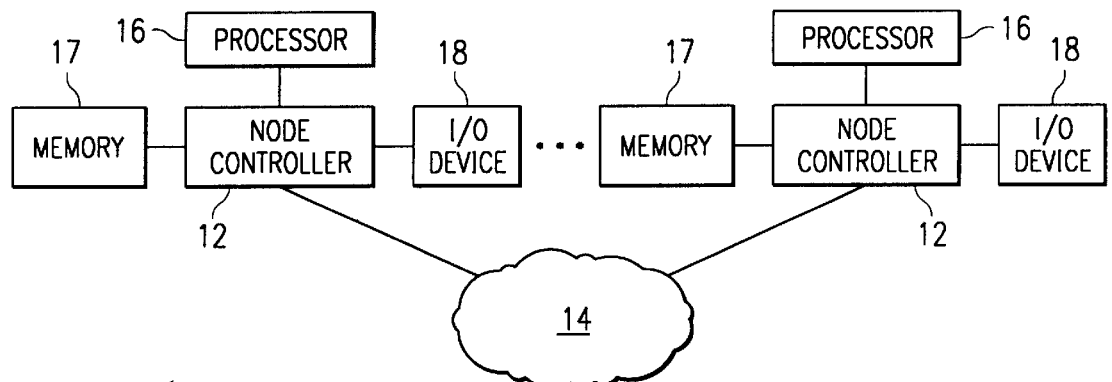
FIG. 1 illustrates a block diagram of a computer system.

FIG. 1 is a block diagram of a computer system 10. Computer system 10 includes a plurality of node controllers 12 interconnected by a network 14. Each node controller 12 processes data and traffic both internally and with other node controllers 12 within computer system 10 over network 14. Each node controller may communicate with a local processor 16, a local memory device 17, and a local input/output device 18.

Figure 2:
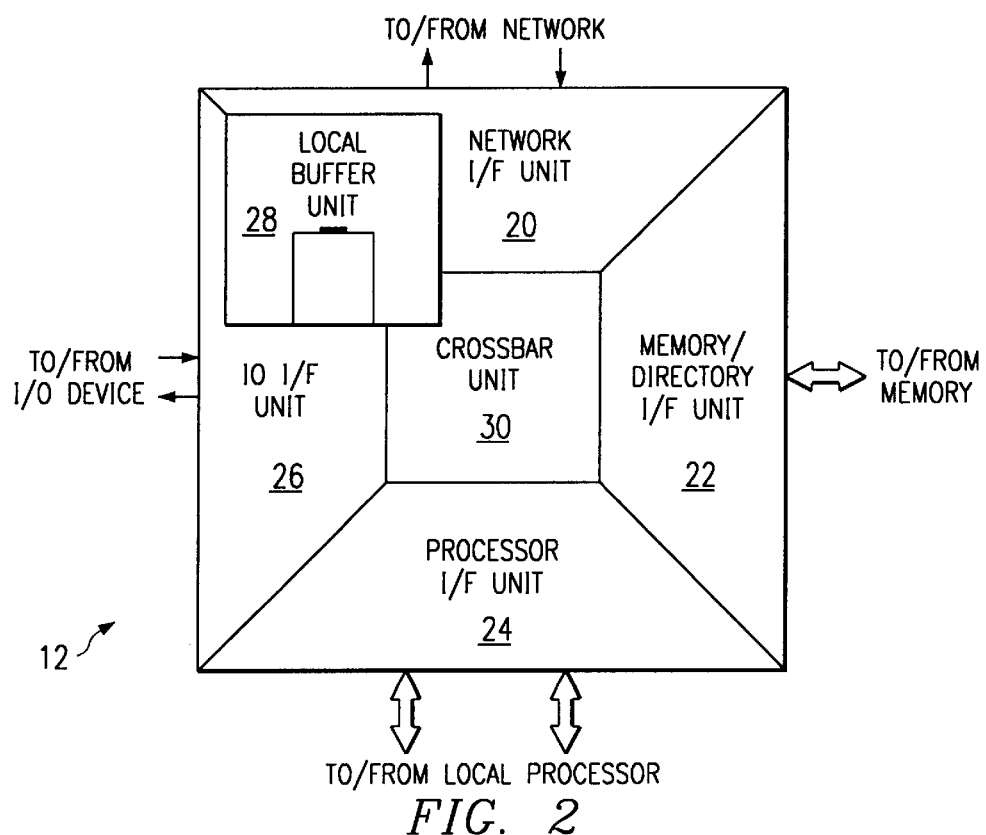
FIG. 2 illustrates a simplified block diagram of a node controller in the computer system.

FIG. 2 is a block diagram of node controller 12. Node controller 12 includes a network interface unit 20, a memory directory interface unit 22, a processor interface unit 24, an input/output interface unit 26, a local buffer unit 28, and a crossbar unit 30. Network interface unit 20 may provide a communication link to network 14 in order to transfer data, messages, and other traffic to other node controllers 12 in computer system 10. Processor interface unit 22 may provide a communication link with one or more local processors 16. Memory directory interface unit 22 may provide a communication link with one or more local memory devices 17. Input/output interface unit 26 may provide a communication link with one or more local input/output devices 18. Local buffer unit 28 is dedicated to processing invalidation requests from local processor 16 or from a remote processor associated with a remote node controller 12. Crossbar unit 30 arbitrates the transfer of data, messages, and other traffic for node controller 12.

Figure 3:
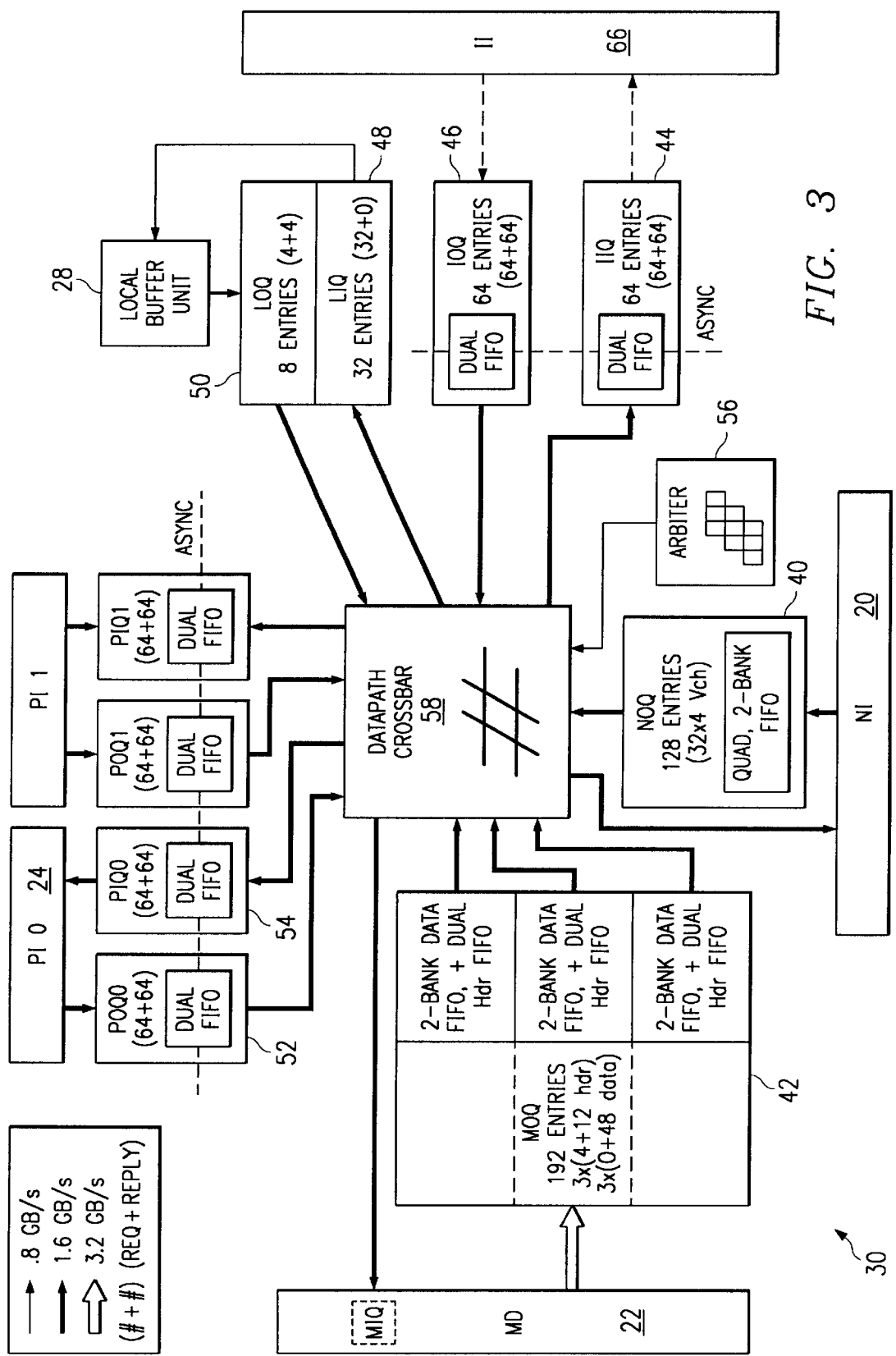
FIG. 3 illustrates a simplified block diagram of a crossbar unit in the node controller.

FIG. 3 is a block diagram of crossbar unit 30. Crossbar unit 30 includes a network interface output queue 40, a memory output queue 42, an input/output input queue 44, an input/output output queue 46, a local buffer input queue 48, a local buffer output queue 50, a processor interface output queue 52, a processor interface input queue 54, an arbiter 56, and a datapath crossbar 58. Datapath crossbar 58 provides data, messages, and other traffic to memory director interface unit 22 and network interface unit 20. Datapath crossbar 58 provides data, messages, and other traffic to processor interface input queue 54 and input/output input queue 44.

Datapath crossbar 58 provides invalidation requests to local buffer input queue 48 for processing by local buffer unit 28. Datapath crossbar 58 receives invalidation messages from local buffer output queue 50 as generated by local buffer unit 28. Datapath crossbar 58 also receives data from memory output queue 42 and data, messages, and other traffic from input/output output queue 46. Datapath crossbar 58 also receives data, control messages, other traffic, and invalidation requests from processor interface output queue 52 and network interface output queue 40. Arbiter 56 determines the configuration of datapath crossbar 58 in transferring data, control messages, other traffic, and invalidation requests among all queues within crossbar unit 30 and units of node controller 12.

Figure 4A:
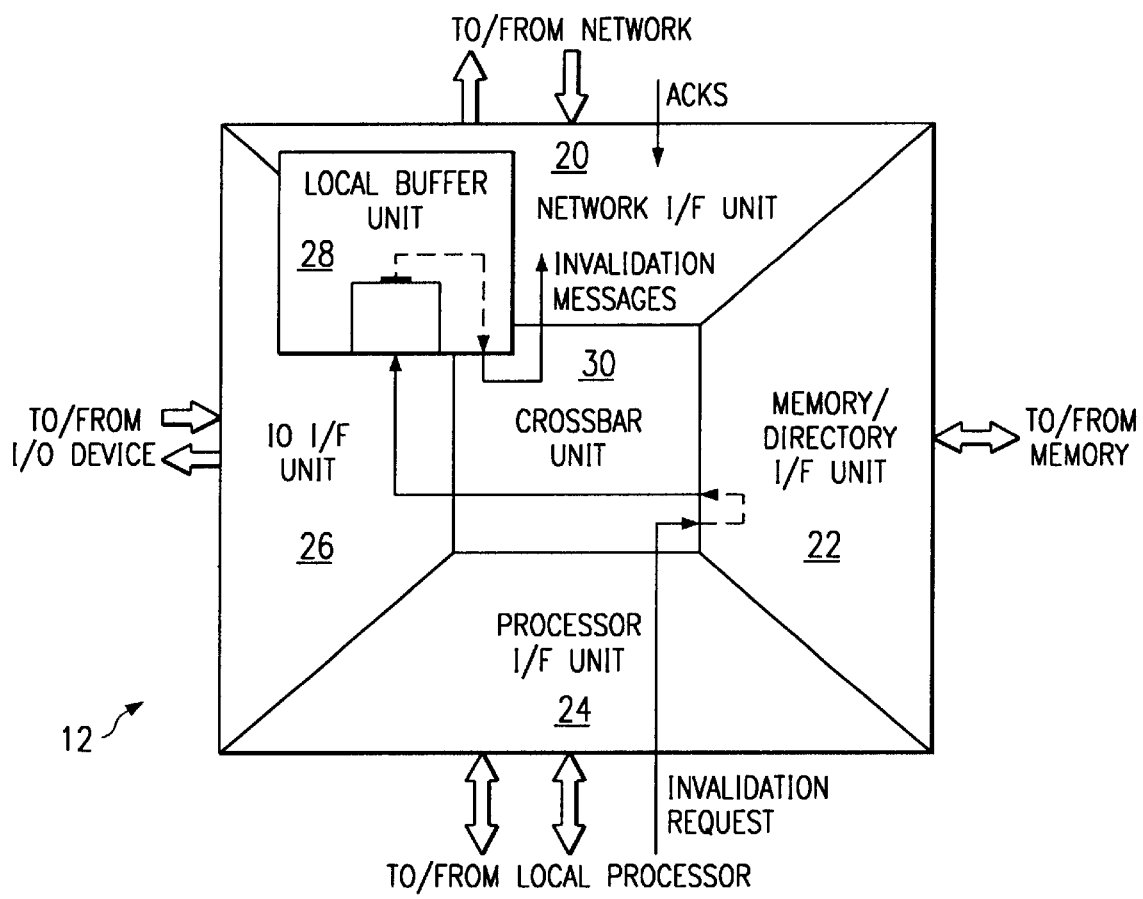
FIGS. 4A and 4B illustrate the processing and broadcasting of invalidation messages in the node controller.
Figure 4B:
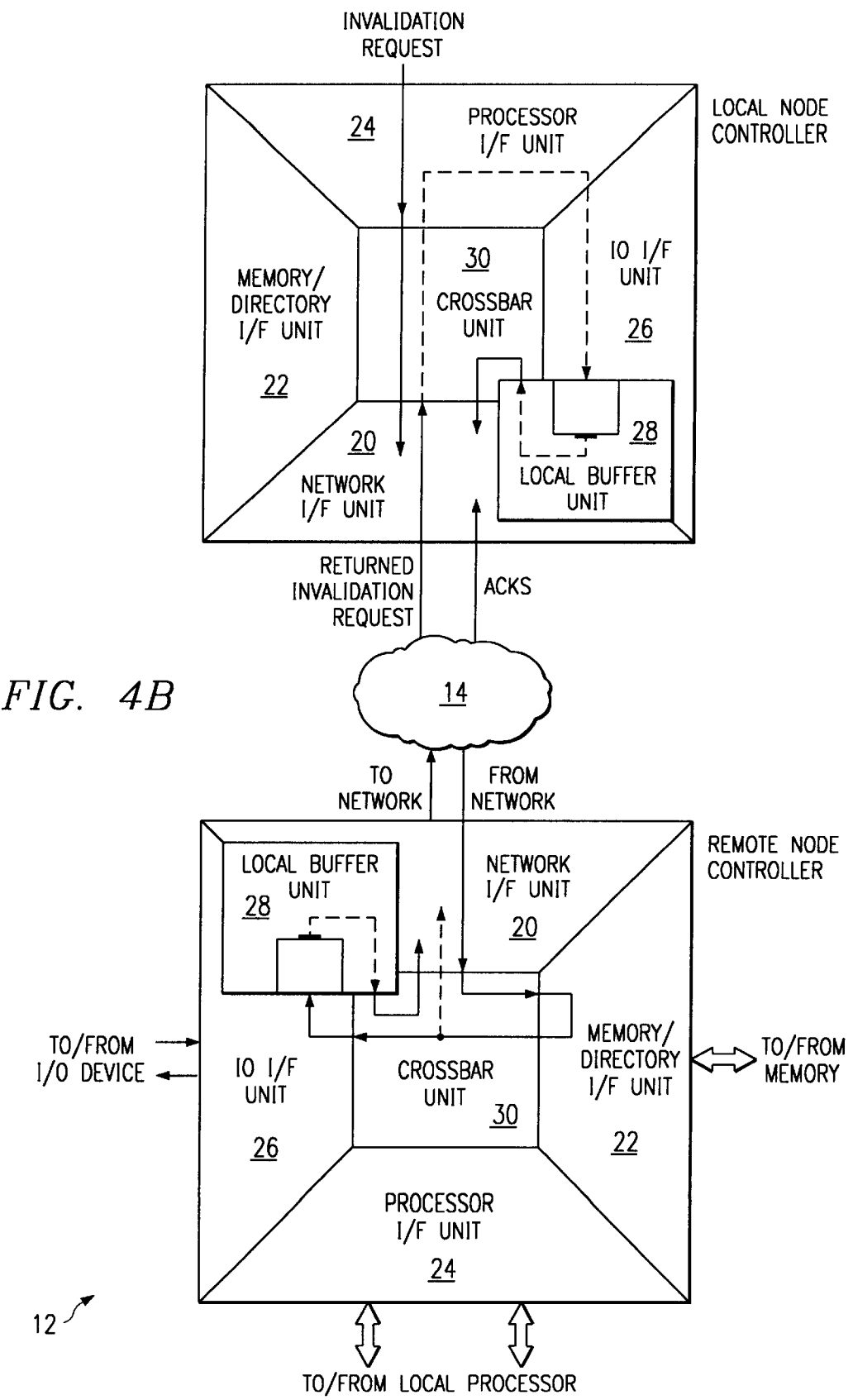

FIGS. 4A and 4B shown how invalidation requests are processed by node controller 12. In FIG. 4A, local processor 16 accesses a memory location within local memory 18 through memory directory interface unit 22 and processor interface unit 24. If local processor 16 alters the particular data at the accessed memory location of local memory 18, local processor 16 generates an invalidation request provided to processor interface unit 26 for transfer to memory directory interface unit 22. Memory directory interface unit generates a compact form of the invalidation request that includes an identity list for all of the remote processors 16 of remote node controllers 12 in computer system 10 that share the particular data being altered. The invalidation request is provided to local buffer input queue 48 through processor interface output queue 52 as transferred by datapath crossbar 58 in crossbar unit 30. Local buffer unit 28 processes the invalidation request by generating an invalidation message for each remote processor 16 indicated within the invalidation request. The invalidation message notifies the remote processor 16 that its version of the particular data is no longer valid. Local buffer unit 28 provides the invalidation messages to local buffer output queue 50 for transfer to network interface unit 22 through datapath crossbar 58 as determined by arbiter 56. Arbiter 56 interleaves the invalidation messages with other traffic using any desired fairness algorithm to ensure that node controller 12 continues to provide a robust operation capability. Acknowledgment messages are generated by remote processors 16 upon receiving and processing its associated invalidation message. The acknowledgment messages are transferred to the local processor 16 that generated the invalidation request to indicate that the remote processor is aware that its version of the particular data is no longer valid.

FIG. 4B shows an alternative processing scheme for invalidation requests. A local processor 16 may alter a memory location located at a remote memory 17 associated with a remote node controller 12. The local processor generates an invalidation request that is sent to the remote node controller 12 where the primary storage for the memory location is maintained. The invalidation request is then processed as discussed above. However, if the remote node controller 12 does not have the available resources to process the invalidation request, the remote node controller 12 returns the invalidation request to the local processor 16. The local processor 16 then processes the invalidation request as discussed above. Acknowledgment messages are sent to the local processor 16 that generated the invalidation. The local processor 16 generating the invalidation request may also forward the invalidation request to another node controller 12 for processing.

Thus, it is apparent that there has been provided, in accordance with the present invention, a method and apparatus of broadcasting invalidation messages in a computer system that satisfies the advantages set forth above. Although the present invention has been described in detail, it should be understood that various changes, substitutions, and alterations may be readily ascertainable by those of skill in the art and may be made herein without departing from the spirit and scope of the present invention as defined by the following claims.

What is claimed is:

1. A node controller for broadcasting invalidation messages in a memory system, comprising:

a memory directory unit operable to control access of data within a local memory device;

a network interface unit operable to receive data and control messages from and provide data and control messages to other node controllers;

a local buffer operable to receive an invalidation request, the local buffer operable to generate a plurality of invalidation messages in response to the invalidation request;

a crossbar unit operable to arbitrate a transfer of data and invalidation messages between the memory directory unit, the network interface unit, and the local buffer.

2. The node controller of claim 1, further comprising:

a processor interface unit operable to receive data and control messages from and provide data and control messages to a local processor.

3. The node controller of claim 2, wherein the data is shared among a plurality of remote processors of a plurality of remote node controllers.

4. The node controller of claim 3, wherein the local processor generates the invalidation request, the invalidation request indicating that particular data within the local memory is desired to be altered by the local processor, the local processor being operable to provide the invalidation request to the local buffer through the crossbar unit, the local buffer being operable to generate the plurality of invalidation messages in response to the invalidation request, each invalidation message destined for a remote processor that shares the particular data.

5. The node controller of claim 4, wherein the local processor receives an acknowledgment from the remote processor sharing the particular data, the acknowledgment indicating that the remote processor has received its invalidation message and providing notice that the remote processor has invalidated the particular data.

6. The node controller of claim 3, wherein the local processor generates an invalidation request, the invalidation request indicating that particular data within a remote memory is desired to be altered by the local processor, the local processor being operable to provide the invalidation request to a local buffer of a remote node controller through the crossbar unit and the network interface unit.

7. The node controller of claim 6, wherein the local processor receives the invalidation request returned from the remote node controller, return receipt of the invalidation request indicating that the remote node controller cannot process the invalidation request.

8. The node controller of claim 7, wherein the local processor providing the invalidation request to the local buffer for processing.

9. The node controller of claim 7, wherein the remote node controller provides invalidation request to another node controller for processing.

10. The node controller of claim 3, wherein the local processor receives the invalidation request from a remote node controller, the local processor providing the invalidation request to the local buffer for processing.

11. The node controller of claim 1, further comprising:
an input/output unit operable to receive data and control messages from and provide data and control messages to a peripheral element.

12. A method of broadcasting invalidation messages in a computer system, comprising:
receiving an invalidation request, the invalidation request indicating that particular data in memory is being altered;
generating an invalidation message for each remote processor that shares the particular data in response to the invalidation request, the invalidation message informing an associated remote processor that its version of the particular data is no longer valid;
interleaving a transfer of the invalidation message with other classes of traffic to prevent clogging a portion of the computer system with the processing of invalidation requests.

13. The method of claim 12, further comprising:
generating the invalidation request at a processor associated with the invalidation message generation.

14. The method of claim 12, further comprising:
generating the invalidation request at a processor remote from the invalidation message generation.

15. The method of claim 14, further comprising:
returning the invalidation message to the processor remote from the invalidation message generation in response to a determination that there is no available resources to generate the invalidation messages.

16. The method of claim 12, further comprising:
receiving an acknowledgment message in response to the transfer of the invalidation message.

17. The method of claim 14, further comprising:
receiving an acknowledgment message in response to the transfer of the invalidation message, the acknowledgment message indicating that a remote processor has received and processed its invalidation message;
passing the acknowledgment message to the processor remote from the invalidation message generation that generated the invalidation request.

18. The method of claim 12, further comprising:
arbitrating the invalidation message with other classes of traffic to determine an order of transfer.

19. The method of claim 18, wherein the arbitration is performed using a standard fairness mechanism.

20. The method of claim 11, further comprising:
specifying the remote processors being affected by the altering of the particular data in a compact form.

* * * * *